July 14, 1953　　　C. VAN AUSDALL　　　2,645,254
TENSION ADJUSTING MEANS FOR CHAIN SAWS OR THE LIKE
Filed June 16, 1949　　　　　　　　　2 Sheets-Sheet 1

Carl Van Ausdall
INVENTOR.

BY Joseph F. Zugelter
Atty.

July 14, 1953     C. VAN AUSDALL     2,645,254
TENSION ADJUSTING MEANS FOR CHAIN SAWS OR THE LIKE
Filed June 16, 1949     2 Sheets-Sheet 2

*Carl Van Ausdall*
INVENTOR.

BY *Joseph F. Zugelter*
Atty.

Patented July 14, 1953

2,645,254

UNITED STATES PATENT OFFICE 2,645,254

TENSION ADJUSTING MEANS FOR CHAIN SAWS OR THE LIKE

Carl van Ausdall, Liberty, Ind.

Application June 16, 1949, Serial No. 99,417

13 Claims. (Cl. 143—32)

The present invention relates to a tension adjuster unit, and may be adapted to various situations in which a flexible member of loop formation requires tightening or loosening relative to its supporting means. By way of example, the invention may be applied to the cutter element of a chain saw which is usually in the form of a chain or similar carrier for saw teeth, connected at its opposite ends to form a loop, and supported for movement upon sprockets, or by means of a driving sprocket and a track. Proper tensioning in such a case is conducive of effective operation of the saw, and usually a release of tension is necessary in removing and replacing the chain.

One object of the invention is to provide an improved form of tension adjuster which is rapid and positive in action, both to tighten and loosen an endless cutter or the like.

Another object is to provide a tension adjuster so constructed as to require a minimum of servicing or care, and which is composed of simple and inexpensive parts that cannot be lost or misplaced in the course of cutter replacements or repairs.

Another object is to enhance the durability and serviceability of a tension adjuster, without the employment of parts subject to loosening in the presence of vibration or hard usage.

A further object is to provide a novel cutter driving unit for application to a garden tractor, with tension adjusting means incorporated therein in such manner as to adjustably support a chain saw in alternative positions, for tree felling or for cutting-off operations.

Another object is to provide a unit of the character stated, which is simple, inexpensive, and highly efficient as a driver and as an adjuster for endless cutters operating in conjunction with wheeled implements.

The foregoing and other objects are attained by the means described herein and illustrated upon the accompanying drawings, in which.

Figure 1:
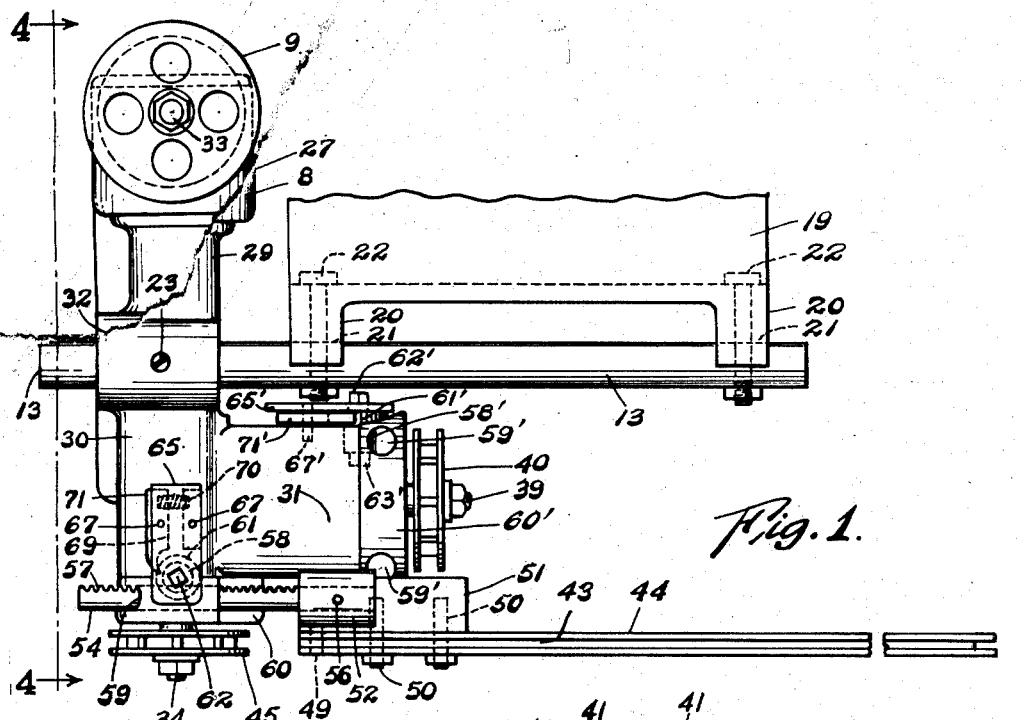
Fig. 1 is an elevational view showing the device of the invention mounted upon the frame of a garden tractor, with a chain saw disposed in substantially horizontal position for tree felling.

As was pointed out previously herein, the device of the present invention may be found applicable to situations and environments of various kinds, where an endless driven member such as a chain, cable, belt or the like requires an adjustable support for tension variation purposes. Accordingly, the invention is not to be limited by the exemplary disclosure of a garden tractor driven chain saw, unless such limitation is carried into the claims appended hereto.

Referring to the drawings, 8 indicates generally a power transmission unit including suitable gearing to be driven by a pulley 9 belted to a garden tractor motor or other source of power. Such a motor is shown at 10, Fig. 3, including a pulley 12 that may drive the transmission unit pulley 9 by means of a belt, not shown. When the transmission unit 8 is applied to the tractor frame, as by mounting the unit upon the parallel mounting rods 13, the pulleys 12 and 9 will be in coplanar relation to receive a driving belt. The mounting rod connection is shown at 13 in each of Figs. 1, 3 and 4.

Figure 3:
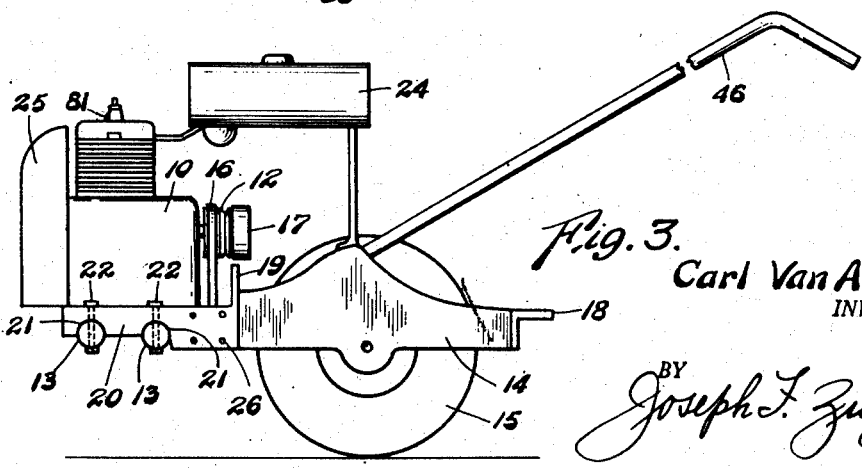
Fig. 3 is a side elevational view of a garden tractor such as might be utilized to power and support the saw and its driving unit.

At this point in the description, it may be noted that the garden tractor of Fig. 3 consists of a frame 14 supporting the single wheel 15, the latter being driven through gearing in the frame actuated by the belt and pulley 16. The pulleys 16 and 12 may be fixed on the shaft of motor 10, or if desired, the drive between the shaft and the pulleys may be effected through a centrifugal clutch or the like 17, carried by the motor shaft. The tractor may be guided by means of handles in the usual manner, and the handles may carry a throttle and a lever for declutching the wheel 15 at a location within the confines of the frame.

At the rear of the tractor frame is a hitch bar 18, while at the forward end the frame carries an extending motor mounting plate or member 19. Plate 19 has sides 20—20 recessed transversely as at 21 to accommodate the pair of mounting rods 13. The rods may be secured in the recesses in any suitable manner, as by means of bolts 22 which pass through transverse holes drilled in the rods. The rods 13 extend from one side of the motor mounting plate, as shown in Fig. 1, and upon these extending ends the power transmission unit 8 is adapted to be supported and locked, as by means of set screws 23. The unit 8 may be shifted along the rods 13 before tightening the set screws, to obtain a proper driving tension of the belt to be applied for driving the pulley 9 from the motor pulley 12.

The characters 24 and 25 indicate, respectively, a fuel tank and a cooling air hood for the motor. Openings 26 in the motor mounting plate may be utilized for the mounting of various implements upon the tractor.

Figure 4:
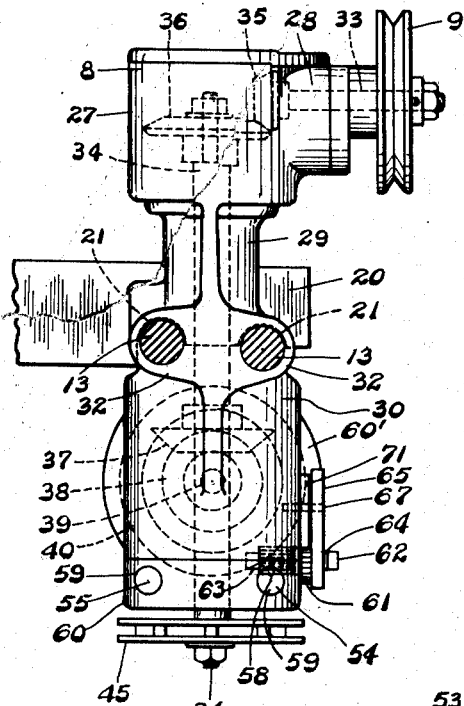
Fig. 4 is a view taken on line 4—4 of Fig. 1, showing one side of the driving unit.

Referring now to Fig. 4, it will be understood that the power transmission unit 8 is a metal casting or casing providing a head 27 having a lateral extension 28, a neck 29 at right angles to extension 28, a lower body portion 30, and a lateral extension 31 integral therewith. Between the neck 29 and the body portion 30, the casing is provided with bosses 32 drilled in substantial parallelism with the body extension 31 to receive the extending ends of the mounting rods 13. As stated before, a set screw 23 in each boss serves as means to securely fix the unit to the mounting rods.

Figure 2:
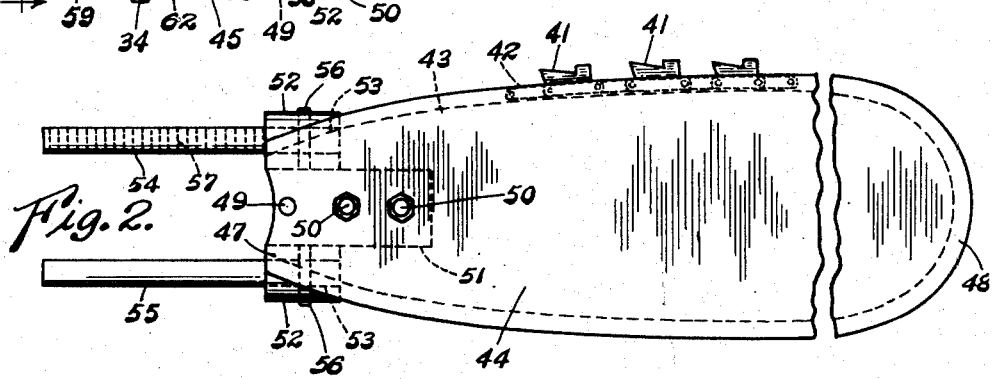
Fig. 2 is a fragmental side elevational view of a cutter assembly, disclosing part of a chain saw and part of the tension adjuster therefor.

Within the head 27 is a pair of bevel gears 35—36, or gears of any other suitable type, meshing to transmit motion of the pulley shaft 33 to the main shaft 34 of the unit. Shafts 33 and 34 are journaled in anti-friction bearings of any approved type. Within the body 30, a bevel gear 37 fixed to the main shaft, meshes with a similar gear 38 to drive a sprocket shaft 39 journaled in the body extension 31. This shaft and extension project laterally in a common direction, at right angles to both of the shafts 33 and 34. Fixed to the end of shaft 39 is a driving sprocket 40 designed to accommodate a chain or similar flexible endless carrier 42 for the saw teeth 41 (Fig. 2). As will be understood, saw teeth are applied to the carrier or chain along the full length of the latter, in accordance with common practice. The chain or carrier, where unsupported by the sprocket, rides in the peripheral groove 43 of a normally stationary blade 44 carried by the housing or case 8. Details of this will be described in due course.

It will be noted that when the unit is applied to the tractor, as in Fig. 1, the sprocket 40 is in a substantially vertical plane. A second sprocket 45, however, is disposed in a substantially horizontal plane, and may be driven by reason of its fixation to the lower end of main shaft 34. This second sprocket is adapted to accommodate and drive the same chain or carrier 42 above mentioned, when the blade is disposed in the operative position of Fig. 1. As will be explained later, the blade is adapted for rapid attachment to the unit housing in alternative positions, for felling and for cutting-off operations. In performing these operations, the workman guides the cutter by manipulating the pair of handles 46 of the tractor to which the unit is applied. Thus, in performing a cutting-off operation, the handles of the tractor will be manipulated in an upright plane, whereas in felling, the handles will be moved laterally to swing the tractor sidewise, the wheel 15 then acting as an upright pivot with relation to the earth or the surface supporting the wheel. As will be understood by referring to Figs. 1 and 3, the unit 8 stands upright, in practically a vertical position, when the tractor frame is substantially horizontal.

The blade 44 may be in the form of a flat rigid plate, or a series of laminations, so constructed as to provide a butt or anchorage end 47, and a forward curved end 48, with a groove 43 extending continuously from one edge of the butt, around the curved end, and back to the butt, as shown upon Fig. 2. The blade may be of any suitable length, and its thickness will of course be less than the overall width of the chain as measured transversely across the saw teeth. This is common practice in the chain saw art, and should require no detailed explanation. At the anchorage end 47, the blade may be perforated as at 49 to accommodate studs, bolts, or other fasteners 50, whereby the blade may be rigidly secured to an adjustable blade support member which is attachable to the unit housing. In the form shown, the blade support member comprises a casting or block 51 of substantial thickness and rigidity, in which are embedded and secured the inner ends of the studs or bolts 50. The block may include integral spaced bosses or ears 52 furnished with parallel bores to tightly accommodate the inner ends 53 of a pair of rods or bars 54 and 55 that extend in a direction opposite to the direction of extension of the blade. The rods or bars may be secured in the bores of the ears 52 by means of pins 56, or otherwise.

The blade butt 47 may be provided with a greater number of perforations 49 than the number of studs 50 carried by the block, in order to permit a greater than normal extension of the blade end 48 from the block, in the event of undue stretching or wearing of the chain. The number and character of the means permitting such extension of the blade relative to the support block 51, is of course subject to variation and choice of the designer.

The rods or bars 54 and 55 are parallel, and the major axis of the blade 44 may or may not be parallel thereto, but nearly so, if desired. Round stock is preferred for the members 54 and 55, although it may be quite possible to make them of angular or part-round stock, if desired. One of the rods is to be milled or otherwise slotted transversely as indicated at 57, to form a rack engageable with a rotary pinion for extending and withdrawing the blade relative to the unit housing. Such a pinion is indicated at 58 upon Figs. 1 and 4. It may be noted that the pinion teeth extend partly into one of the parallel bores 59 which slidably receive the rods 54 and 55. These bores 59 preferably are drilled in an end cap 60 which closes the lower end of unit body part 30. The end cap may also carry the lower bearing (not shown) for the main shaft 34.

Figure 5:
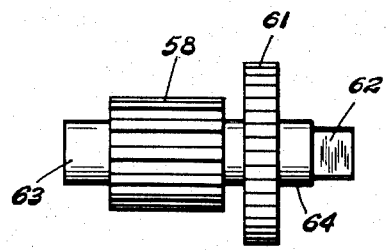
Fig. 5 is an enlarged view of a ratchet wheel and gear assembly which forms a detail of the tension adjuster.

Referring to Figs. 4 and 5, it will be seen that pinion 58 is on a shaft with a ratchet wheel 61, both the pinion and the wheel being fixed to or made integral with the shaft. One end 62 of the shaft is squared or otherwise formed to receive a tool, whereby the pinion may be rotated to reciprocate the rack rod 54 and the saw blade attached thereto. The opposite end 63 of the rack actuator shaft is preferably round, and serves as a bearing area to support the shaft within the body 30. A second bearing area for the shaft is shown at 64, and this bearing area is journaled in a plate 65 secured to the side of the housing body. The plate may be rigidly mounted on the body by means of screws or pins 67.

Referring to Fig. 1, it should readily be understood that any continuous chain or the like resting in the blade groove 43 and embracing the sprocket 45, may be tightened or tensioned by rotating the pinion shaft head 62 in counterclockwise direction. By rotating the shaft head in the opposite direction, the chain may be relieved of tension, even to the extent of permitting its removal bodily from the sprocket and the chain groove. After removal of the chain, the pinion shaft may be rotated counterclockwise sufficiently to eject the rods 54 and 55 from their guide bores 59, thereby enabling the operator to completely detach the blade assembly of Fig. 2 from the unit.

Normally, rotation of the pinion shaft 62 in the clockwise or tension-relieving direction, is opposed by a pawl 69 engaging the teeth of ratchet wheel 61 (Fig. 1). The pawl may pivot at 67, and its engaging end may be yieldingly urged against the ratchet wheel teeth by means of any suitable type of spring or yielding means, here shown at 70 as a coiled compression spring. By means of this arrangement, the operator may simply rotate the pinion shaft head in counterclockwise direction to tension the saw chain, and when the proper tension point is reached, the pawl 69 holds the pinion shaft against reverse rotation. Thus, the tension adjustment is accomplished easily and quickly with no further effort, and without tightening any supplemental clamps or bolts subsequently to adjustment.

When the operator wishes to rotate the pinion shaft for removal of the saw chain, he need only depress the exposed butt 71 of the pawl to overcome the force of spring 70, whereupon the ratchet wheel is released and allows free rotation of the pinion in counterclockwise direction. With the pawl so disengaged, the guide rods 54 and 55 may be easily retracted to the right for complete displacement of the saw blade assembly.

The foregoing description has referred to manipulation and adjustment of the chain saw in the environment illustrated by Fig. 1, which shows the blade disposed horizontally for felling a standing tree, for example. Subsequently to the felling operation, the user of the device may wish to saw the tree into short lengths. This will require a vertical disposition of the blade 44. Accordingly, the lateral extension 31 (Fig. 1) of the unit housing is provided with an end cap 60' similar to that at 60, and carrying the same constituent elements as were just described with respect to the tension adjustment. The end cap 60' has its rod-receiving bores 59' disposed in a vertical or upright plane, so that by inserting therein the rods of the Fig. 2 blade assembly, the blade will repose in a plane which includes a diameter of sprocket 40. Thus, the blade 44 will be disposed in a vertical plane, which is proper for cutting-off operations.

The end cap 60' and body extension 31 carry the same arrangement of pinion, pawl, and ratchet wheel assembly as was previously explained herein, wherefore it is believed superfluous to repeat the description of such parts. Accordingly, the parts which are identical have been denoted by primed reference characters corresponding to the parts previously described. Thus, the pawl 69' is identical to pawl 69, pinion 58' is identical to pinion 58, ratchet wheel 61' is identical to wheel 61, etc. When the blade assembly of Fig. 2 is mounted by means of the bores 59' of cap 60', the tension adjustment and all other manipulations are as previously set forth.

From the foregoing, it is apparent that the blade assembly may be disposed in alternative operating positions, with no appreciable expenditure of time and effect. The power transmission unit 8 remains fixed to the tractor, and it is not necessary to disturb the driving connection between the motor pulley 12 and the unit pulley 9.

All operating parts subject to wear are encased and run in lubricant, so that troublesome replacement of parts has been largely eliminated.

Figure 6:
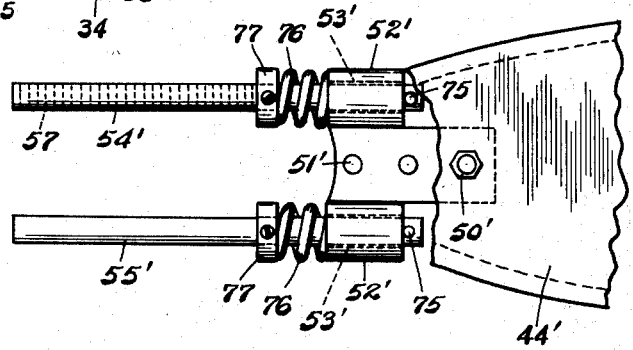
Fig. 6 is a view similar to Fig. 2, showing a modified form of cutter support.

The illustration, Fig. 6, suggests a modified form of blade assembly that might be substituted for the assembly shown in Fig. 2. In the modified structure, a shock absorbing feature is incorporated, to dampen shocks transmitted as the saw chain encounters hard spots or any obstructions in the material operated upon. The character 44' in this instance indicates a blade similar to blade 44, including fastening means 50'. The support 51' is distinguishable from support 50, in that the ears 52' are provided with bores 53' enlarged sufficiently to permit sliding movement of the rods 54' and 55' therein. Movement of the rods in one direction is limited by pins or stops 75 secured to the rod ends, whereas movement in the opposite direction is yieldingly opposed by springs 76 or other yielding means located between each ear 52' and a collar or shoulder 77 fixed upon each rod intermediate its ends. By means of this arrangement in the blade assembly, any obstruction tending to cramp or stop the saw chain while in operation, will result in limited momentary slackening of the chain as permitted by the springs, followed by a slight jump or jerk sufficient to relieve the chain and return it to normal tension. The shock absorbing function of the assembly will tend also to cushion any shocks that might otherwise be transmitted to the tractor, and the operator thereof.

The device of the present invention constitutes a vast improvement over devices heretofore proposed for performing the same or similar work, and under exhaustive tests has proven highly effective. All adjustments and interchanges are quickly made with little effort, and with one simple tool. There are no detachable or removable small parts to be lost or misplaced in normal use of the device, and this feature not only avoids annoyance and delay, but accidents also.

It is to be understood that various modifications and changes in the structural details of the device may be made, within the scope of the appended claims, without departing from the spirit of the invention. For example, the blade 44 will sometimes be provided with a chain track other than a groove such as 43, a rib being a common expedient in the art. Drive pulley 9, of course, might well be a sprocket, and the nature of the gearing within the case or housing 8 is a matter immaterial to the invention. Moreover, the pawl and ratchet wheel arrangement for locking the blade, is to be considered but one of several common means that might be employed as an overrunning clutch or one-way automatic latch suitable to perform the desired function. Other possible equivalents and alterations will obviously suggest themselves to persons skilled in the machinery art.

I claim:

1. A chain saw attachment for application to a motor-driven vehicle, comprising in combination, a housing including an upright main drive shaft rotatable within the housing, a lateral extension on the housing substantially at right angles thereto, a second shaft longitudinally mounted for rotation in said extension and including a driving connection with the main drive shaft, a second lateral extension on the housing including a third shaft at substantial right angles to both the main drive shaft and the second shaft, said third shaft including a driving connection with one of the other shafts for rotation therewith, a sprocket, fixed on the third shaft aforesaid, an elongate flat chain-supporting blade, cooperative means associated with the blade and the housing, for supporting the blade in the plane of the sprocket, and means for mounting the housing upon a motor driven vehicle, with the motor in driving relation with said second shaft.

2. A chain saw attachment for application to a motor-driven vehicle, comprising in combination, a housing including an upright main drive shaft rotatable within the housing, a lateral extension on the housing substantially at right angles thereto, a second shaft longitudinally mounted for rotation in said extension and including a driving connection with the main drive shaft, a second lateral extension on the housing including a third shaft at substantial right angles to both the main drive shaft and the second shaft, said third shaft including a driving connection with one of the other shafts for rotation therewith, a sprocket fixed on the third shaft aforesaid, an elongate flat chain-supporting blade, cooperative means associated with the blade and the housing, for supporting the blade in the plane of the sprocket, means for adjusting the blade toward and from the sprocket, and means for mounting the housing upon a motor driven vehicle, with the motor in driving relation with said second shaft.

3. A chain saw attachment for application to a motor-driven vehicle, comprising in combination, a portable housing including a pair of bored bosses receptive of a pair of parallel bars extending from the vehicle, means for securing the housing at preselected locations upon the parallel bars, a saw-chain driving sprocket mounted upon the housing in a substantially vertical plane, means for driving the sprocket from the vehicle motor, an elongate flat chain-supporting blade, and cooperative means associated with the blade and the housing, for support of the blade in the plane of the sprocket.

4. A chain saw attachement for application to a motor-driven vehicle, comprising in combination, a housing including a pair of bored bosses receptive of a pair of parallel bars extending from the vehicle, means for securing the housing at preselected locations upon the parallel bars, a saw-chain driving sprocket mounted upon the housing in a substantially horizontal plane, means for driving the sprocket from the vehicle motor, an elongate flat chain-supporting blade, and cooperative rack and pinion means associated with the blade and the housing, for support of the blade in the plane of the sprocket, the rack being mounted upon the blade, and the pinion being rotatably supported upon the housing for manual actuation for extending and retracting the rack, and latch means normally precluding rotation of the pinion in one direction.

5. A detachable driving unit for an endless band type of cutter, comprising an upright hollow housing bored transversely for slidably receiving a mounting bar, a lateral hollow extension on the housing disposed substantially at right angles thereto, an upright main drive shaft rotatable within the housing, said shaft having an end exposed exteriorly of the lower end of the upright housing, a second shaft journaled within the housing extension and disposed substantially at right angles to the main drive shaft, said second shaft having an end exposed beyond the housing extension, gear means imparting rotation of the main drive shaft to the second shaft, a band cutter support wheel on the exposed end of the main shaft, and a band cutter support wheel on the exposed end of the second shaft, a flat elongated band cutter support blade having an edge over which the band cutter is trained, and selective means for detachably supporting said blade upon the housing in the plane of either band cutter support wheel.

6. A detachable driving unit for an endless band type of cutter, comprising an upright hollow housing including means for detachable mounting thereof upon a vehicle, a lateral hollow extension on the housing disposed substantially at right angles thereto, an upright main drive shaft rotatable within the housing, said shaft having a free end exposed exteriorly of the lower end of the upright housing, a second shaft journaled within the housing extension and disposed substantially at right angles to the main drive shaft, said second shaft having a free end exposed beyond the housing extension, means within the housing imparting rotation of the main drive shaft to said second shaft, a band cutter support wheel on the exposed free end of the main drive shaft, and a band cutter support wheel on the exposed free end of the second shaft, a flat elongated band cutter support blade having an edge over which the band cutter is trained, selective means upon the housing adjacent to each cutter support wheel, for detachably supporting the blade in the plane of either of said wheels selectively, and means near each of said wheels to retain the blade at various distances therefrom in the wheel plane.

7. A driving unit for an endless band type of cutter, comprising an upright hollow housing including means for mounting same upon a vehicle, an upright main drive shaft journaled for rotation within the housing, said shaft having an end exposed exteriorly of the lower end of the upright housing, said housing being bored transversely near the lower end thereof to re-receive a blade support bar, a band cutter support wheel on the exposed end of the main drive shaft, and a flat elongated blade having an edge over which the band cutter is trained, a blade support bar on the blade, receptive in the transverse bores of the upright hollow housing, for detachably supporting the blade in the plane of the band cutter support wheel, a series of teeth on the blade support bar, and means at the transverse bores of the upright housing, to engage certain of the teeth and thereby selectively position the blade support bar.

8. A driving unit for an endless band type of cutter, comprising an upright hollow housing including means for mounting same upon a vehicle, an upright main drive shaft journaled for rotation within the housing, a lateral hollow extension on the housing disposed substantially at right angles thereto, a second shaft journaled within the housing extension and disposed substantially at right angles to the main drive shaft, said second shaft having a free end exposed beyond the housing extension end, said extension end being bore transversely to receive a blade support bar, means imparting rotation of the main drive shaft to said second shaft, a band cutter support wheel on the exposed end of the second shaft, a flat elongated blade having an edge over which the band cutter is trained, a blade support bar on the blade, receptive in the transverse bores of the housing extension, for detachably supporting the blade in the plane of the band cutter support wheel, a series of teeth on the blade support bar, and means to engage the teeth of the blade support bar, including a releasable one-way clutching device normally opposing advancement of the bar through the bores.

9. A driving unit for an endless saw chain, comprising an upright hollow housing including means for mounting same upon a vehicle, an upright main drive shaft journaled for rotation within the housing, said shaft having an end exposed exteriorly of the lower end of the upright housing, said housing being bored transversely near the lower end thereof to receive a blade support bar, a sprocket on the main drive shaft at the exposed end thereof, an endless saw chain, a flat elongated blade having an edge over which the chain is trained, a blade support bar on the blade, receptive in the transverse bores of the upright housing for detachably supporting the blade and the chain in the plane of the sprocket, with the chain engaging the sprocket, and releasable clutch means operative upon the blade support bar at the transverse bores of the upright housing, to restrain shifting of the blade under the force of tension imposed thereon by drag on the chain in use.

10. A chain-saw construction which comprises in combination, a hollow elongate housing including an axial shaft bearing near one end thereof, a shaft journaled in the bearing and having an end extending beyond the end of the housing, a chain supporting wheel fixed on the shaft end for rotation therewith, the housing end having a pair of spaced parallel openings therein located at opposite sides of the shaft transversely thereof, a substantially flat blade-like member of oblong configuration having a forward end and a butt, a pair of rod-like extensions on the butt slidably received in the spaced parallel openings of the housing end, said extensions being located upon the blade-like member to position said member in the plane of the wheel aforesaid, an endless saw chain trained over the wheel and the forward end of the blade-like member, a line of rack teeth on one of the rod-like extensions, a rack pinion located interiorly of the housing and including a manually rotatable shaft journaled in the housing at right angles to one of the extension-receiving openings of the housing, with the teeth of the pinion obstructing part of said one opening and engaging the rack teeth of said one extension, a ratchet wheel on the pinion shaft, and a displaceable pawl on the housing normally opposing rotation of the ratchet wheel and pinion in one direction.

11. A device in accordance with claim 10, in which the rod-like extension which carries the rack teeth, includes a cushion connection with the butt of the blade-like member.

12. A chain saw construction which comprises in combination, a hollow elongate housing including a shaft bearing near one end thereof, a shaft journaled in the bearing and having an end extending beyond the end of the housing lengthwise thereof, a chain supporting wheel fixed on the shaft end for rotation therewith, the housing end having a transverse opening therein located to one side of the shaft at right angles to the shaft axis, a second opening in the housing in close proximity to the first opening and arranged transversely thereof to support a rotary pinion shaft, a substantially flat blade-like member of oblong configuration having a forward end and a butt, a rod-like extension on the butt slidably received in the first-mentioned opening of the housing end, said extension being located upon the blade-like member to position said member in the plane of the chain supporting wheel, an endless saw chain trained over the wheel and the forward end of the blade-like member, a line of rack teeth on the rod-like extension, a rack pinion located within the limits of the housing and including a manually rotatable shaft journaled in the aforesaid second opening of the housing at right angles to the extension-receiving opening thereof, with the teeth of the pinion obstructing part of the opening last mentioned, and engaging the rack teeth of the extension, means precluding rotation of the extension in the extension-receiving opening, and releasable means normally precluding rotation of the rack pinion in one direction.

13. A device in accordance with claim 12, in which the rod-like extension carrying the rack teeth, includes a cushioned connection with the butt of the blade-like member.

CARL VAN AUSDALL.

References Cited in the file of this patent

UNITED STATES PATENTS

| Number | Name | Date |
|---|---|---|
| 463,414 | Brown | Nov. 17, 1891 |
| 1,050,769 | Johnson | Jan. 14, 1913 |
| 1,438,786 | Roberts | Dec. 12, 1922 |
| 2,348,588 | Arsneau | May 9, 1944 |
| 2,357,230 | Shade | Aug. 29, 1944 |
| 2,370,556 | Mall | Feb. 27, 1945 |

FOREIGN PATENTS

| Number | Country | Date |
|---|---|---|
| 118,817 | Australia | Aug. 14, 1944 |